United States Patent
Funawatari

[11] Patent Number: 5,667,616
[45] Date of Patent: Sep. 16, 1997

[54] DISC CARTRIDGE MOLDING METHOD AND APPARATUS

[75] Inventor: Takatsugu Funawatari, Miyagi, Japan

[73] Assignee: Sony Corporation

[21] Appl. No.: 527,040

[22] Filed: Sep. 12, 1995

[30] Foreign Application Priority Data

Sep. 19, 1994 [JP] Japan .................................. 6-223752

[51] Int. Cl.⁶ .................................................. B29C 47/00
[52] U.S. Cl. .......................... 156/245; 156/242; 156/500; 264/328.1; 425/577
[58] Field of Search ................... 156/73.1, 242, 156/245, 500, 580.1; 264/328.1; 425/577

[56] References Cited

U.S. PATENT DOCUMENTS

| | | | |
|---|---|---|---|
| 4,900,380 | 2/1990 | Matsuzawa | 156/73.1 |
| 4,909,871 | 3/1990 | Todo et al. | 156/73.1 |
| 5,204,047 | 4/1993 | Wohlrab | 264/328.1 |
| 5,204,127 | 4/1993 | Prusha | 425/544 |
| 5,340,528 | 8/1994 | Machida et al. | 264/328.7 |
| 5,372,770 | 12/1994 | Machida | 264/255 |
| 5,388,982 | 2/1995 | Takahashi et al. | 425/572 |
| 5,536,456 | 7/1996 | Kuwahara et al. | 264/1.33 |

*Primary Examiner*—James Sells
*Attorney, Agent, or Firm*—Jay H. Maioli

[57] ABSTRACT

A disc cartridge is made up of an upper cartridge part and a lower cartridge part for housing a disc-shaped recording medium, such as an optical disc or a magneto-optical disc. At least one of the upper cartridge part and the lower cartridge part has a head-accessing aperture for exposing at least a portion of the disc-shaped recording medium to the outside. Apparatus for making the disc cartridge includes a first die having a protrusion for forming the head-accessing aperture. The first die defines a cavity on an upper surface of the upper or lower cartridge part, a second die defines a cavity on the inner surface of the upper or lower cartridge part, and an insert die is formed separately from and united to the second die. The insert die has an extension for forming an end face on the inner surface of the upper or lower cartridge part and a protrusion from the extension for abutting the protrusion of the first die during die closure for forming the head-accessing aperture in the upper or lower cartridge part. The second die has at its end portion connected to the insert die a protrusion extending towards the first die. The second die is connected to the insert die with an end face of the extension of the insert die being protruded further towards the first die than the end face of the protrusion of the second die.

7 Claims, 11 Drawing Sheets

DISC CARTRIDGE MOLDING METHOD AND APPARATUS

BACKGROUND OF THE INVENTION

This invention relates to a disc cartridge housing for a disc-shaped recording medium, such as an optical disc or a magneto-optical disc. More particularly, it relates to a method and apparatus for molding a disc cartridge having means for preventing the disc-shaped recording medium from being damaged at an edge portion of a head-accessing opening. The disc-shaped recording medium is referred to herein collectively as an optical disc.

The optical disc is a recording medium capable of recording or having recorded thereon desired information signals, such as speech or picture signals, with a high recording density. The optical disc is housed for rotation in a cartridge main body to form a disc cartridge. The optical disc having a diameter of not more than 64 mm is capable of recording speech signals continuing for 74 minutes, while the main cartridge body is of an extremely small size, its diameter being as small as 6 mm.

When the disc cartridge is loaded on the recording/ reproducing apparatus, the optical disc has its center portion loaded on a disc rotating driving unit so that it is driven at a high rpm. While the optical disc housed within the disc cartridge is run in rotation, a laser beam is radiated from an optical pickup mounted on the recording/reproducing apparatus to the disc for reproducing information signals recorded on an information signal recording area formed on the major surface of the disc. On the other hand, while a laser beam radiated from the optical pickup is illuminated on an information signal recording area of e.g., a magneto-optical disc, as a recordable optical disc, an external magnetic field modulated by an external magnetic field generating device in accordance with information signals to be recorded is applied for recording desired information signals.

Referring to FIGS. 1 and 2, a cartridge main body 100 is constituted by an upper cartridge or part 101 and a lower cartridge or part 102, both being in the shape of shallow saucers, and an optical disc 1 rotatably housed within the cartridge main body 100. That is, the upper and lower cartridge halves 101, 102 are formed with peripheral upstanding wall sections, annular wall sections, not shown, formed on the inner surfaces for being abutted against each other for defining a housing space for the optical disc 1, and with plural engagement protrusions. The upper cartridge half 101 and the lower cartridge half 102 are assembled together by abutting the upstanding peripheral wall sections and the annular wall sections to one another and welding by an ultrasonic welder, not shown, for constituting the thin box-shaped cartridge main body 100.

For unifying the upper and lower cartridge halves 101, 102 together, ultrasonic waves are applied from an ultrasonic welder applied to the lower cartridge half 102 to the fitting protrusions on the inner surfaces or upstanding peripheral or annular wall sections formed on the inner surfaces, with the protrusions or the wall sections being oscillated and locally heated and fused so as to be fused together on terminating the impression of the ultrasonic waves.

The mid portion of the lower cartridge half 102 constituting the cartridge main body 100 is formed with a circular opening operating as an opening for permitting intrusion of a disc table 120 therein on loading the disc cartridge in the recording/reproducing apparatus, as shown in FIG. 2. The disc table 120 is mounted on the recording/reproducing apparatus and operates for running the optical disc 1 in rotation. Specifically, the opening for insertion of the disc table 120 exposes to the outside a magnet-clamping hub 4 which is provided for closing a center opening of the optical disc 1.

The disc table 120 has a center spindle shaft 121 for passing through the center of the disc table from the lower side to the upper side, and a annular magnet 122 around the spindle shaft 121. The disc table 120, intruded via the disc table intrusion opening formed in the lower cartridge half 102, is engaged in a spindle shaft opening formed in the hub 4, and attracts and holds the hub 4 by the magnet 122 for holding the disc cartridge.

The upper and lower cartridge halves 101, 102, making up the cartridge main body 100 are formed with rectangular-shaped head-accessing openings 103 (FIG. 3 et seq.) exemplified by openings 103A, 103B(FIGS. 1 and 2), respectively, in register with each other. These rectangular-shaped openings 103A, 103B are formed for exposing portions of the information recording area on the major surface of the disc 1 rotatably housed within the cartridge main body 100 to the outside and permit intrusion therein of an optical pickup mounted on the recording/reproducing apparatus. These head-accessing apertures 103 are formed as rectangular-shaped openings extending from a mid portion in the transverse side of the cartridge main body 100 as far as a portion proximate to the opening for intrusion of the disc table.

A U-shaped shutter member, not shown, for opening/ closing the head accessing apertures 103, is mounted on the disc cartridge. The shutter member usually closes either head accessing aperture 103 under the force of resiliency of a shutter spring, not shown, for preventing intrusion and deposition of dust and dirt in the inside of the disc cartridge via either head accessing aperture 103. When loaded on the recording/reproducing apparatus, the shutter member is moved by a shutter opening member to a second position opening the head accessing aperture 103. To this end, the shutter opening member is mounted on the recording/ reproducing apparatus for being engaged with a shutter opening guide groove, not shown, formed in the front side of the cartridge main body 100.

The upper and lower cartridge halves 101, 102 making up the cartridge main body 100 of the disc cartridge are molded by injecting a molten synthetic resin material into a cavity of a die device. The die device is roughly made up of a movable die 130 (FIGS. 3 and 5) defining a cavity for the inner side of the cartridge half 101 or 102 and a stationary die 131 towards and from which the movable die 130 is moved with a die closing and die opening movement for defining a cavity for the front side of the cartridge half 101 or 102, as shown in FIG. 3. For defining the head-accessing aperture 103, the die device also includes an insert die (auxiliary die) 132 which is built in the movable die 130 for being abutted against the stationary die 131 during die closure for defining the cavity for the head-accessing aperture 103.

The inner surfaces of the upper and lower cartridge halves 101, 102 facing each other are likely to make contact with the optical disc 1 rotatably contained in the cartridge main body 100. Thus the surface of the movable metal mold 130 of the die device is ground for improving surface smoothness of the inner surfaces of the upper and lower cartridge halves 101. The die device is configured for arcuately chamfering the opening edge of the head-accessing aperture 103 for preventing the surface of the optical disc 1 from being damaged by being chafed against the opening edge of the aperture 103. With the present die device, for chamfering the opening edge portion of the head-accessing aperture 103, a chamfered portion 104 is formed at the proximal end of a protruding portion of the auxiliary die 132 designed to form a cavity for forming the head-accessing aperture, and die matching is achieved at this chamfered portion 104.

One of the problems encountered in injection molding is that burrs tend to be produced on the registration surfaces of the dies due to tolerances or abrasion of the dies, and that, since the registration surfaces of the movable die and the auxiliary die are positioned on the inner surfaces of the upper and lower halves 101, 102, the burrs produced on the inner surfaces of the upper and lower cartridge halves tend to damage the major surface of the optical disc.

For overcoming such deficiency, it may be envisaged to employ a die device made up of a movable die 140 having a cavity-defining protrusion on its major surface for defining a head-accessing aperture 103, and a stationary die 141, as shown in FIG. 4. With such die device, the cavity-defining protrusion of the movable die 140 defining the head-accessing aperture 103 is abutted against the stationary die 141.

This die device suffers from an inconvenience that it is extremely difficult to register the movable die 140 with respect to the stationary die 141 in a region of the head-accessing aperture 103 during mold closure. The die device also suffers from a drawback that a grinder mechanism is likely to be abutted against the cavity-forming protrusion to render it difficult to grind the surface of the stationary die 140. Consequently, this type of the die device is scarcely put to practical utilization and hence a die device having the auxiliary die as described above is generally employed.

However, the above-described die device employing the insert die suffers from the phenomenon of sagging of the surface end portion of the ground movable die towards the die matching surface with the insert die 132 as a result of grinding, as shown in FIG. 5. This phenomenon occurs on the surface of the movable metal mold 130 to a depth of approximately 10 to 30 μm depending on the grinding tolerance. The result is that burrs 105 are produced on the inner surface along the opening edge 104 of the head-accessing opening 103, as shown in FIG. 6.

These burrs 105 raise a problem that, during the time when the upper and lower cartridge halves 101, 102 ape ultrasonically welded to each other or when the disc cartridge is being chucked to the disc table 120, the burrs 105 tend to be contacted with the optical disc 1 to mar its surface, as shown in FIG. 7.

That is, during ultrasonic welding of the upper and lower cartridge halves 101, 102, the optical disc 1 housed within the cartridge main body 100 is vibrated within the inside of the cartridge main body 100 under impressed ultrasonic waves, so that its surface is caused to impinge strongly on the surfaces of the upper and lower cartridge halves 101, 102. In such case, the optical disc 1 tends to be vibrated in an inclined position within the inside of the cartridge main body 100 so that its major surface is caused to bear against the opening edge 104 of the head-accessing aperture 103. Since the burrs 105 are occasionally produced on the opening edge 104 of the head-accessing aperture 103, the surface of the optical disc 1 tends to be injured by these burrs 105.

During chucking of the disc cartridge, the disc table 120 is intruded via the disc-intrusion opening into the interior of the cartridge main body 100. However, since the optical disc 1 is not positioned accurately within the cartridge main body 100, there are occasions wherein the spindle shaft 121 thrusts the optical disc 1 towards the upper half 101 via the hub 4. Of course, the optical disc 1 is subsequently chucked in the regular manner by the spindle shaft 121 engaging in the spindle shaft opening of the hub 4, as shown in FIG. 2.

If the optical disc 1 is thrust by the spindle shaft 121, there are occasions wherein the optical disc 1 is thrust in a tilted state in the interior of the cartridge main body 100 such that the major surface of the optical disc 1 is caused to bear against the opening edge 104 of the head-accessing opening 103, as shown in FIG. 1. Since the burrs 105 tend to be produced on the opening edge 104 of the head-accessing aperture 103, the surface of the optical disc 1 tends to be marred by these burrs 105.

OBJECTS AND SUMMARY OF THE INVENTION

It is therefore an object of the present invention to provide a die device for molding a disc cartridge in which the surface of the disc-shaped recording medium is not marred during the ultrasonic welding process or loading on the recording/reproducing apparatus by burrs generated on the die matching surface which is in register with the opening edge of the head-accessing aperture.

It is another object of the present invention to provide a die device for molding a disc cartridge in which the surface of the disc-shaped recording medium is not marred during the ultrasonic welding process or loading on the recording/reproducing apparatus by burrs produced in the vicinity of the opening edge of the head-accessing aperture at the time of molding.

According to the present invention, there is provided an apparatus for molding a disc cartridge having an upper cartridge half and a lower cartridge half and a disc-shaped recording medium rotatably housed within a space defined by the upper cartridge half and the lower cartridge half, at least one of the upper cartridge half and the lower cartridge half having a head-accessing aperture for exposing at least a portion of the disc-shaped recording medium to the outside. The apparatus includes a first die having a protrusion for forming the head-accessing aperture. The first die is configured for defining a cavity on an upper surface of the upper or lower cartridge half. The apparatus also includes a second die for forming a cavity on the inner surface of the upper or lower cartridge half, and an insert die formed separately from and united to the second die. The insert die has an extension for forming an end face on the inner surface of the upper or lower cartridge half and a protrusion from the extension for being abutted against the protrusion of the first die during mold closure for forming the head-accessing aperture in the upper or lower cartridge half. The second die has a protrusion extending towards the first die at an end portion thereof connected to the insert die. The second die is connected to the insert die so that an end face of the extension of the insert die is protruded further towards the first die than the end face of the protrusion of the second die.

Preferably, the first die is a stationary die and the second die is a movable die. Also preferably, the extension of the insert die merges with the protrusion via an arcuate surface.

Preferably, the end face of said second die towards the first die is ground.

According to the present invention, there is also provided a method for molding a disc cartridge having an upper cartridge half and a lower cartridge half and a disc-shaped recording medium rotatably housed within a space defined by the upper cartridge half and the lower cartridge half, at least one of the upper cartridge half and the lower cartridge half having a head-accessing aperture for exposing at least a portion of the disc-shaped recording medium to the outside. The method includes forming the upper cartridge half or the lower cartridge half having the head-accessing aperture by the above-defined apparatus, combining the upper cartridge half and the lower cartridge half with the disc-shaped recording medium in-between, and securing the upper cartridge half and the lower cartridge half together by ultrasonic welding.

With the above-described die device for molding the disc cartridge according to the present invention, there are formed recesses along the opening edges of the head-accessing aperture of the cartridge half being molded, and die matching is caused to occur between a movable die configured for forming a cavity for the inner surface of the cartridge half and an insert die configured for forming a cavity for the head-accessing aperture by being built in the movable die, so that burrs produced by the grinding operation for the surface of the stationary die are positioned in the recess without being abutted against the major surface of the disc for protecting the disc from damages done by these burrs.

DESCRIPTION OF PREFERRED EMBODIMENTS

Figure 1:
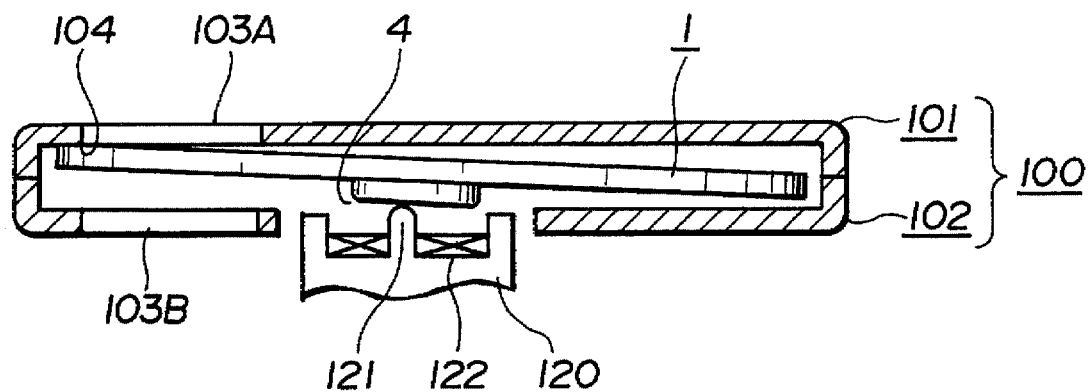
FIG. 1 illustrates the chucking operation in which a disc table of a recording/reproducing apparatus is intruded via a disc table entrance opening on loading a disc cartridge on the recording/reproducing apparatus.
Figure 2:
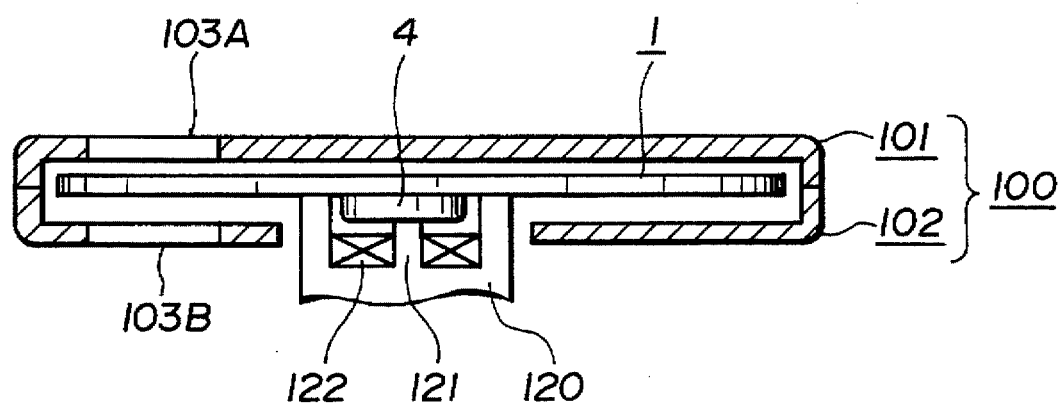
FIG. 2 illustrates the chucking state.
Figure 3:
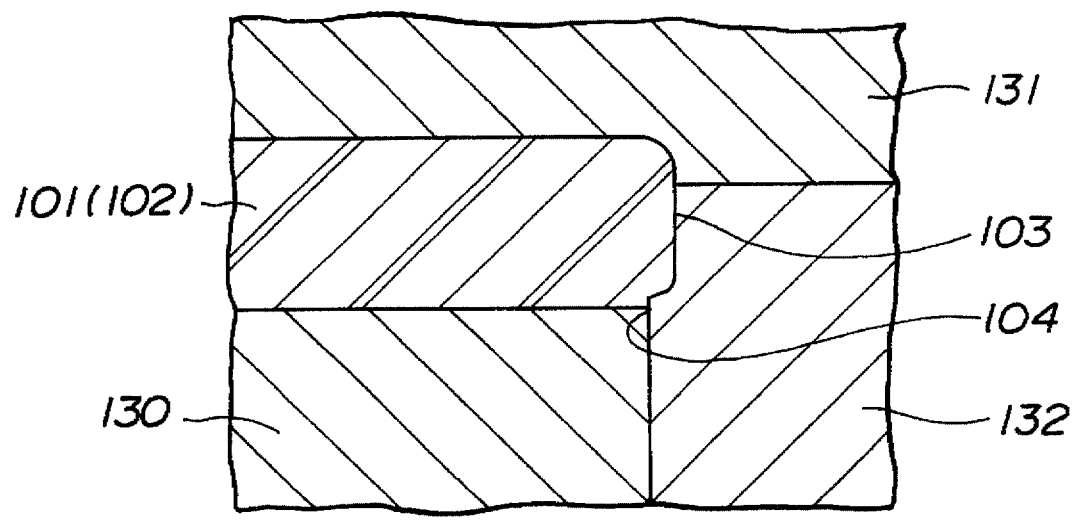
FIG. 3 is a schematic longitudinal cross-sectional view showing a conventional die device for molding cartridge halves of a disc cartridge and also showing a head-accessing aperture formed in a cartridge half.
Figure 4:
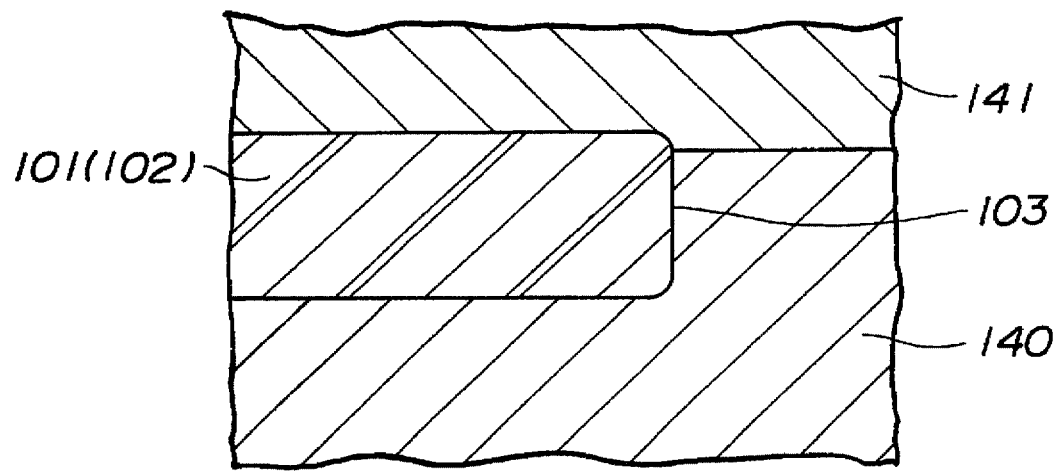
FIG. 4 is a schematic longitudinal cross-sectional view showing another conventional die device for molding cartridge halves of a disc cartridge and also showing a head-accessing aperture formed in a cartridge half.
Figure 5:
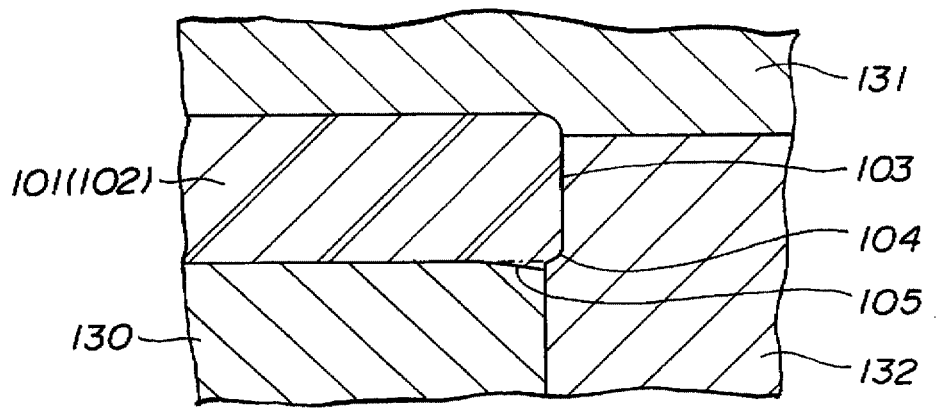
FIG. 5 is a schematic longitudinal cross-sectional view showing a conventional die device for molding cartridge halves of a disc cartridge and also showing burrs produced due to grinding on the surface of a stationary die.
Figure 6:
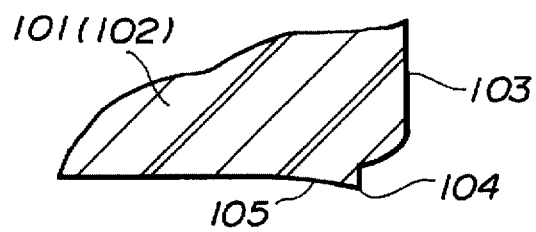
FIG. 6 is a schematic longitudinal cross-sectional view showing burrs produced due to molding with the conventional die device.
Figure 7:
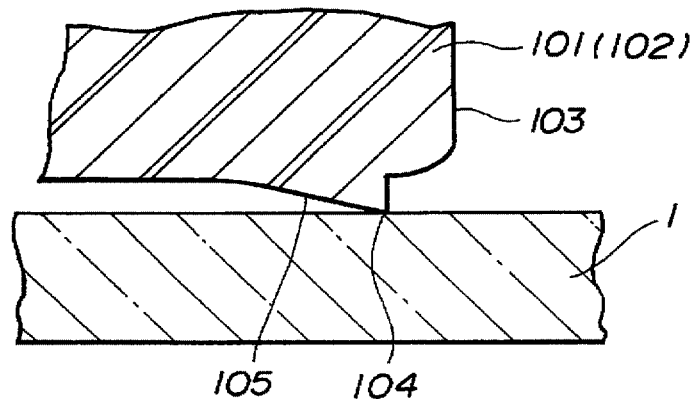
FIG. 7 illustrates the state in which the optical disc is damaged by burrs produced on the cartridge half.

Referring to the drawings, preferred embodiments of the present invention will be explained in detail. The disc cartridge of the illustrated embodiment has a main cartridge body 10 made up of shallow saucer-shaped upper and lower halves 11, 12 molded of a synthetic resin material by a metal mold device as later explained, and an optical disc 1 rotatably housed therein, as shown in FIGS. 8 to 11.

The optical disc 1 is comprises of a disc substrate 2 and a hub 4 for magnet clamping which is fitted in a center opening 3 of the disc substrate 2. The disc substrate 2 is formed as a disc from glass or a transparent synthetic resin, such as polycarbonate resin, and has a center opening 3 and an information signal recording area for recording information signals centered about the center opening 3. The hub 4 is formed of a magnetic material, such as metal, and is comprises of a bottomed cylindrical fitting portion 5 and an outer peripheral flange portion 6 extending from the fitting portion 5. The fitting portion 5 includes a spindle shaft opening 7 into which is fitted a spindle shaft of a recording/reproducing apparatus, herein not shown.

The upper half 11 and the lower half 12 are formed with upstanding peripheral wall sections 13A, 13B, respectively. The wall sections 13A, 13B are collectively termed upstanding peripheral wall sections 13. When the upper and lower cartridge halves 11, 12 are assembled together, these peripheral wall sections 13 are abutted against each other for constituting an outer peripheral wall section of the cartridge main body 10. On the inner surface of the upper and lower halves 11, 12, facing each other, there are formed disc housing upstanding wall sections 14A, 14B which are formed as plural partially arcuate upstanding wall sections concentrically arranged for inscribing the upstanding peripheral wall sections 13 and which are abutted against each other in the assembled state of the upper and lower cartridge halves 11, 12 for defining an optical disc housing.

The disc housing upstanding wall sections 14A, 14B are collectively termed disc housing upstanding wall sections 14. On the inner surface of the upper and lower halves 11, 12, facing each other, there are also formed a plurality of abutting fitting protrusions 15A, 15B, in register with each other, respectively. These abutting fitting protrusions 15A, 15B are also collectively termed abutting fitting protrusions 15.

The upper and lower cartridge halves 11, 12 are combined and unified together with the upstanding peripheral wall sections 13 and the disc housing upstanding wall sections 14 abutted against each other and with the abutting fitting protrusions 15 abutted against each other and by ultrasonically welding them together using an ultrasonic welder 110 to constitute the rectangular thin box-shaped cartridge main body 10.

The portions of the inner surface of the upper and lower halves 11, 12 in register with the disc housing section delimited by the disc housing upstanding wall sections 14 are formed as highly smooth surfaces for avoiding possible damages to the surface of the optical disc 1.

The lower half 12 has a circular disc table intruding center opening 16. Into this center opening 16 is inserted a disc table 120 of the recording/reproducing apparatus driving the optical disc 1 housed within the cartridge main body 10 on loading the disc cartridge 10 on the recording/reproducing apparatus. The disc table intruding or insertion opening 16 exposes the hub 4 formed of a magnetic plate for magnet clamping, provided for closing the center opening 3 of the optical disc 1 to the outside. The upper cartridge half 11 has an annular optical disc holding center wall section 17 at its mid portion in register with the disc table intruding opening 16. The optical disc holding wall section 17 defines the position of the outer periphery of the hub 4 of the optical disc 1 and enables smooth rotation of the optical disc 1 within the interior of the main cartridge body 10.

Figure 13:
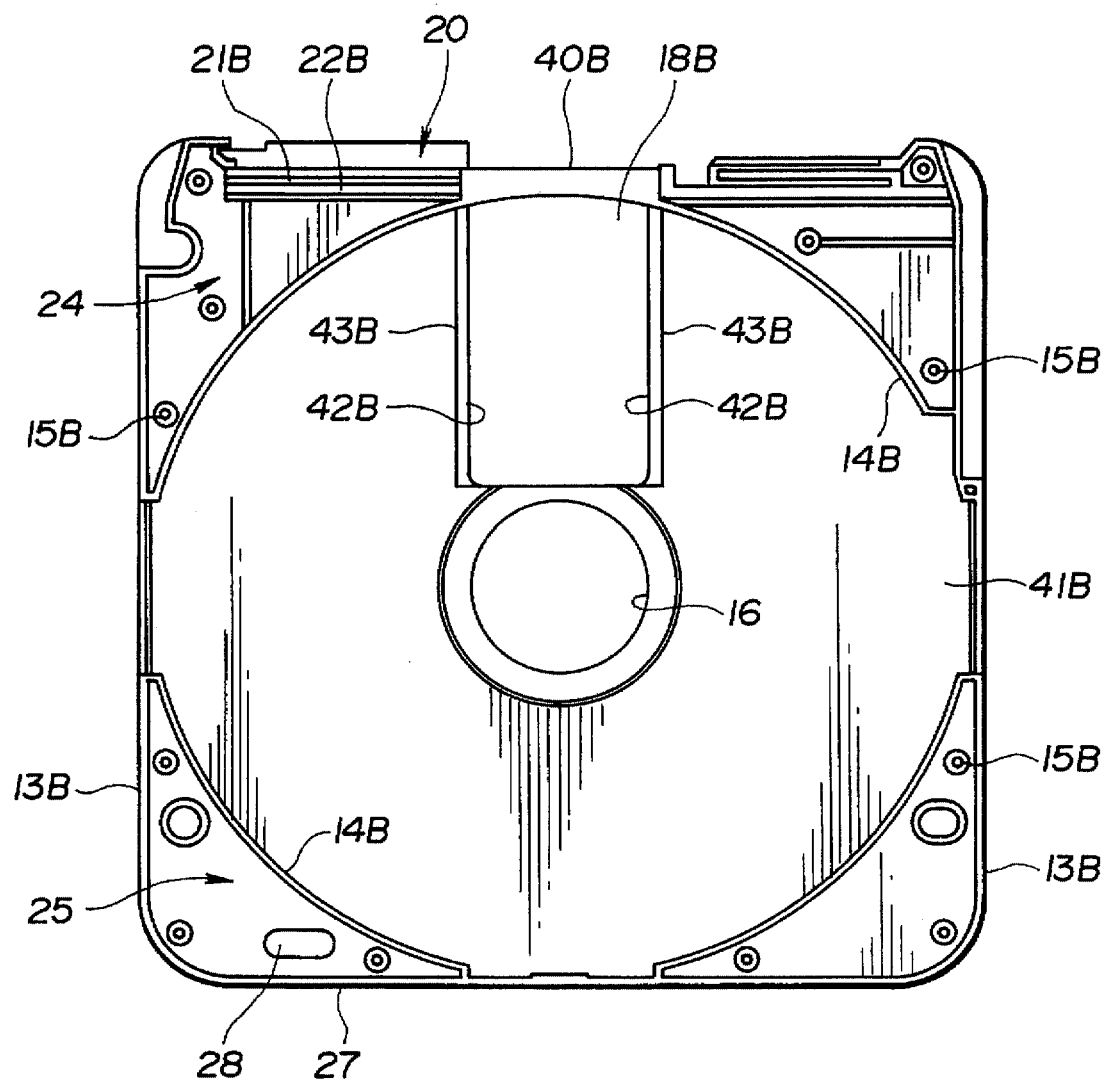
FIG. 13 is a bottom plan view showing the bottom side of the lower cartridge half, that is the side of abutment thereof with the upper cartridge half, of the disc cartridge shown in FIG. 8.

The upper cartridge half 11 and the lower cartridge half 12 are formed with head-accessing apertures 18A, 18B in register with each other for allowing at least a portion of the information signal recording area of the optical disc 1 rotatably housed within the optical disc housing section to be exposed to the outside across the inner and outer rims of the disc. The head-accessing apertures 18A, 18B are collectively termed head-accessing apertures 18. These head-accessing apertures 18 are rectangular-shaped and extended from the position proximate to the disc table intruding opening 16 and the disc holding wall sections 17 as far as a mid portion of the transverse lateral side of the cartridge main body 10, as shown in FIG. 13.

The upper and lower cartridge halves 11, 12, constituting the cartridge main body 10, are formed with shutter slide recesses 19A, 19B, which are collectively termed shutter slide recesses 19. These shutter slide recesses 19 are each of a depth substantially equal to the plate thickness of first and second shutter portions 32, 33 of a shutter member 30 as later explained and cover a region which is traversed by the shutter member 30 and which extends from the periphery of the head-accessing apertures 18 as far as a lateral side and a front side of the cartridge main body 10. The shutter member 30 may be assembled within the shutter slide recesses 19 so that the shutter portions 32, 33 thereof are flush with the major surface of the cartridge main body 10. Thus the disc cartridge is not increased in thickness by assembling the shutter member 30 on the cartridge main body 19.

The upstanding peripheral wall sections 13, delimiting the outer peripheral wall section of the cartridge main body 10 as described above, are not formed on the front side of the cartridge main body 10. That is, the cartridge main body 10 is open on its front side and has a shutter opening guide groove 20 into which is inserted a shutter opening member of the recording/reproducing apparatus configured for moving the shutter member 30. On the inner surfaces of the upper and lower cartridge halves 11, 12 slightly inwardly of the front sides formed with the shutter guide groove 20, there are formed transversely extending guide ribs 21A, 21B in register with each other. These guide ribs 21A, 21B are collectively termed guide ribs 21. Inwardly of these guide ribs 21, there are formed transversely extending guide recesses 22A, 22B in the upper and lower cartridge halves 11, 12, in register with each other, respectively. These guide recesses 22A, 22B are collectively termed guide recesses 22.

The guide ribs 21 are of a height slightly smaller than that of the upstanding peripheral wall section 13 and, in the assembled state of the upper and lower cartridge halves 11, 12, constitute transversely extending guide protrusions for guiding a slide member 35 as later explained in the interior of the cartridge main body 10. The guide recesses 22 constitute transversely extending guide recesses adjacent to the guide protrusions for guiding the slide member 35 in the assembled state of the upper and lower cartridge halves 11, 12.

The cartridge main body 10 is open on its front side in register with the head-accessing apertures 18, as described previously. For maintaining mechanical strength of the front side having the head-accessing apertures 18, the upper and lower cartridge halves 11, 12 are formed inwardly of the shutter opening guide groove 20 with connecting portions 40A, 40B, respectively. These connecting portions 40A, 40B are collectively termed connecting portions 40. These connecting portions 40 interconnect opening edges 42A, 42A, 42B, 42B on the front side of the head-accessing apertures 18. These opening edges 42A, 42A, 42B, 42B are collectively termed opening edges 42.

The connecting portions 40 are joined together in the assembled state of the upper and lower cartridge halves 11, 12 since the upper end faces of the connecting portions 40 abutted together are flush with the upper end faces of the disc housing upstanding wall sections 14. The inner lateral sides of the connecting portions 40 are arcuately-shaped so as to connect to the disc housing upstanding wall sections 14. In addition, the front sides of the connecting portions 40 are flush with the front sides of the guide protrusions of the cartridge main body in order to permit sliding movement of a rod-shaped base portion 38 of the slide member 35 as later explained. The lateral sides of the connection portions 40 operate as stops for limiting the movement of the shutter member 30 between first and second positions.

The inner surfaces of the upper and lower cartridge halves 11, 12 are formed with recesses 43A, 43A, 43B, 43B extending along the opening edges 42 of the head-accessing apertures 18. These recesses 43A, 43A, 43B, 43B are termed collectively as recesses 43. These recesses 43 are used as the die matching position for a fixed die 60 and an auxiliary die 62, as will be explained subsequently. The opening edges 42 of the head-accessing apertures 18 are arcuately chamfered in continuation from the recesses 43.

Figure 9:
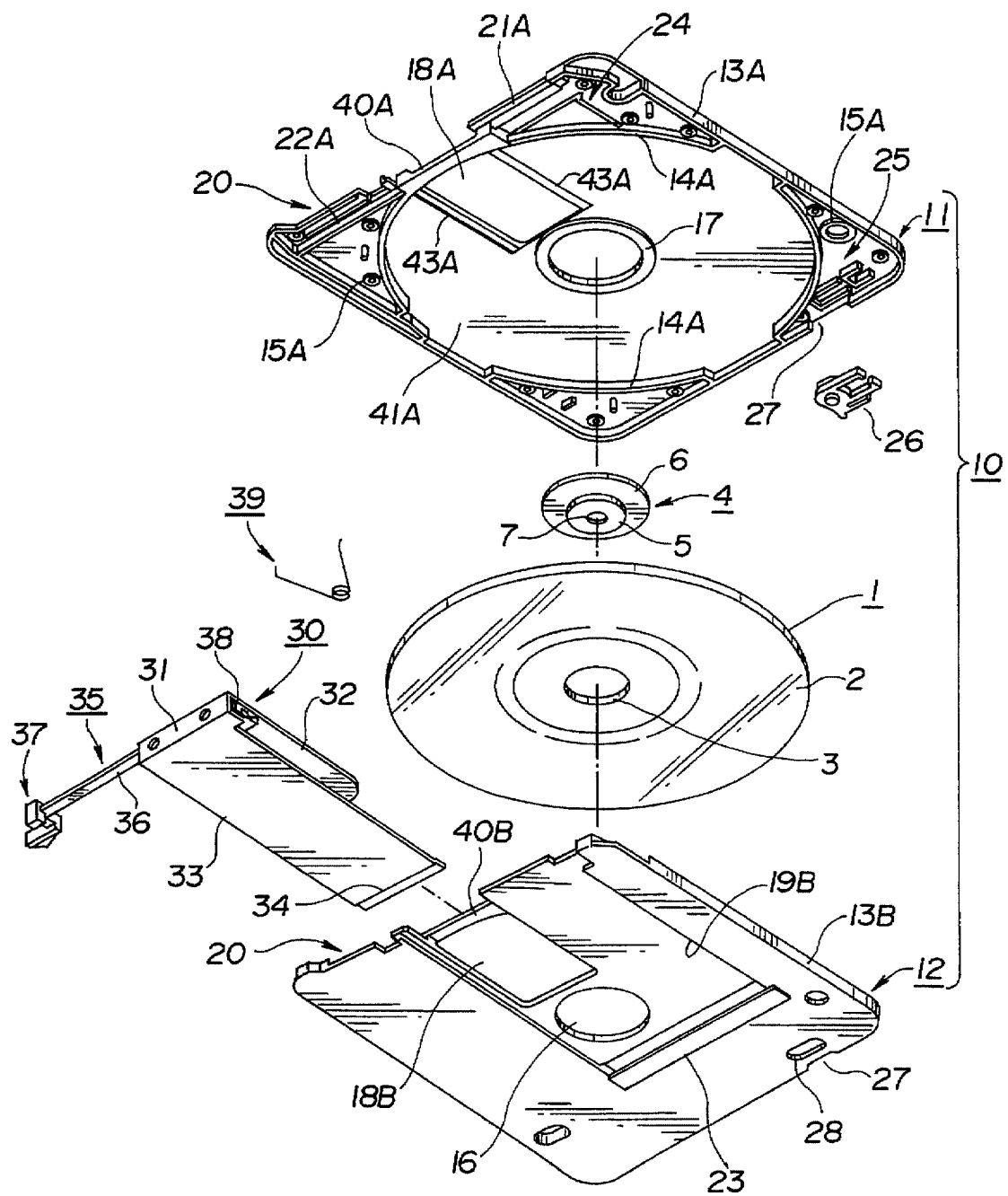
FIG. 9 is an exploded perspective view, looking from the bottom side, for illustrating the inner structure of the disc cartridge shown in FIG. 8.
Figure 10:
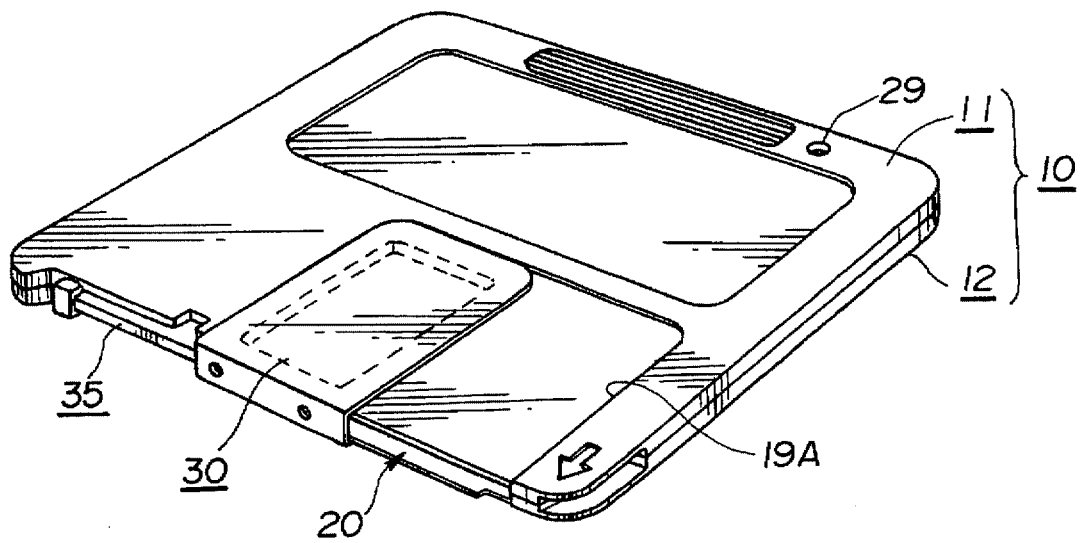
FIG. 10 is a perspective view showing the disc cartridge shown in FIG. 8.

The lower cartridge half 12 is formed with a transversely extending shutter slide groove, not shown, in continuation to the shutter slide recess 19B in a region of the slide recess 19B at the back of the disc table intruding opening 16, as shown in FIG. 9. The shutter guide groove is formed in the major surface of the lower cartridge half 12, more specifically, in the bottom surface of the shutter slide recess 25. The shutter guide groove is engaged by a bent terminal guide portion 34 of the second shutter portion 33 of the shutter member 30 extended from the main portion of the shutter member 30 for closing the disc table intruding opening 16.

Figure 11:
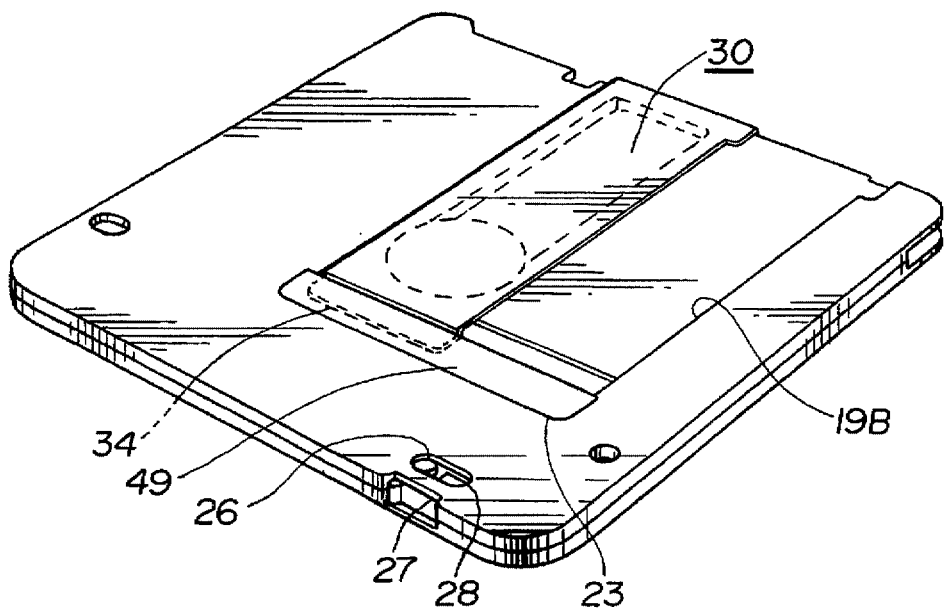
FIG. 11 is a perspective view showing the disc cartridge shown in FIG. 8, looking from the bottom side.
Figure 12:
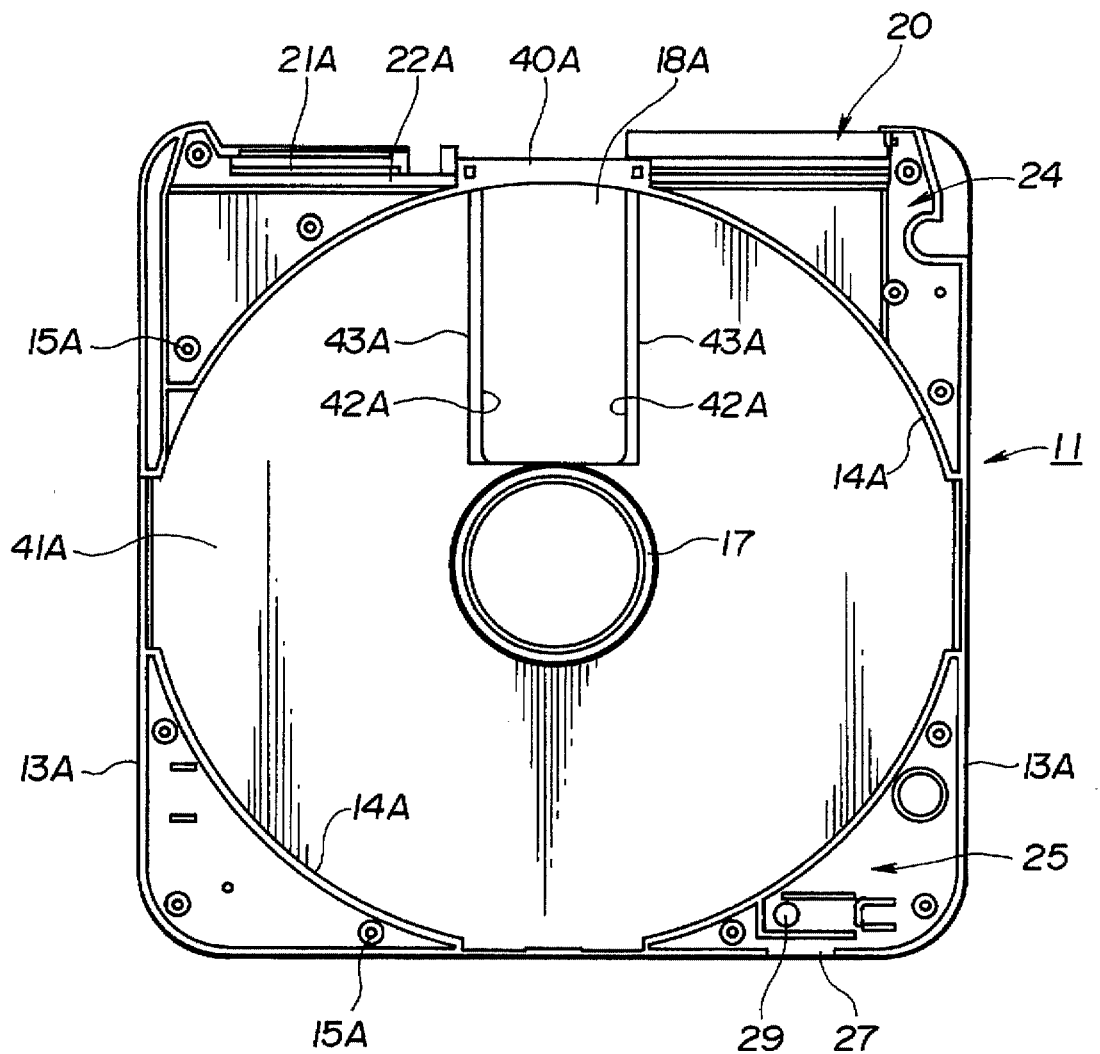
FIG. 12 is a bottom plan view showing the bottom side of the upper cartridge half, that is the side of abutment thereof with the lower cartridge half, of the disc cartridge shown in FIG. 8.

The terminal guide portion 34 of the second shutter 33, engaged in the shutter guide groove, is held by a shutter retention plate 49 connected to a connecting recess 23 provided in the lower cartridge half 12. This connecting recess 23 is formed as a transversely extending rectangular-shaped recess of a depth substantially equal to the depth of the shutter slide recess 19B, as shown in FIGS. 9 and 11. The connecting recess 23 is formed in the lower cartridge half 12 with a transverse dimension slightly larger than the transverse dimension of the shutter slide recess 19B so that it is extended transversely beyond the connecting portion thereof with the shutter slide recess 19B.

The shutter retention plate 49 is formed as a transverse rectangular-shaped plate of extremely thin thickness from e.g., stainless steel (SUS) and has a thickness substantially equal to the depth of the connecting recess 23. The retention plate 49 is secured to the connecting recess 23 with a piece of a double-sided adhesive tape which is of a slightly shorter length than the connecting recess 23 and which is previously applied to the reverse surface of the shutter retention plate 19. The shutter retention plate 49 is bonded and secured to the connecting recess 23 with the rear lateral side of the connecting recess 23 as a reference, for retaining the terminal guide portion 34 of the shutter member 30, over the entire range of movement of the shutter member 30, by its foremost edge overlying the shutter guide groove in the shape of a visor, thereby preventing possible floating of the shutter member 30.

The disc cartridge has a mistaken recording preventing mechanism for preventing inadvertent erasure of information signals recorded on the optical disc 1. This inadvertent erasure preventing mechanism is made up of a mistaken recording preventing member 26 and a mistaken recording detection hole 29 provided in the upper cartridge half 11. The mistaken recording prohibiting member 28 is provided at a rear corner 25' of the lower cartridge half 12 opposite to the front corner 24 provided with a shutter spring 39.

The mistaken recording preventing member 26 is moved along a guide hole 28 formed parallel to the rear wall section of the lower cartridge half 12 and has its operating portion facing an operating notch 27 formed by partially cutting the rear upstanding peripheral wall sections 13 of the upper and lower cartridge halves 11, 12. By actuating the operating portion via the operating notch 27, the mistaken recording preventing member 26 is switched between a first position of closing the inadvertent recording detection hole 29 and a second position of opening the inadvertent recording detection hole 29.

When set to the first position of closing the mistaken recording detection hole 29, the mistaken recording preventing member 26 prevents the mistaken recording detection mechanism provided on the recording/reproducing apparatus from being inserted into the mistaken recording detection hole 29 for allowing information signals to be recorded on the optical disc 1. When set to the second position of closing the mistaken recording detection hole 29, the mistaken recording preventing member 26 permits the mistaken recording detection mechanism provided on the recording/reproducing apparatus to be inserted into the mistaken recording detection hole 29 for inhibiting recording of information signals on the optical disc 1.

For preventing dust and dirt from being intruding into the disc housing via the head-accessing apertures 18 so as to be deposited on the optical disc 1, the cartridge main body 10 is fitted with the shutter member 30 for closing the head-accessing apertures 18. The shutter member 30 is integrally connected to the slide member 35 assembled in the shutter opening guide groove 20 formed in the front side of the cartridge main body 10 as later explained and is movable between the first state of closing the head-accessing apertures 18 and the second state of opening the head-accessing apertures 18.

The shutter member 30 is prepared by press-working a thin metal plate and comprised the first shutter member 32 and the second shutter member 33 dimensioned to close the head-accessing aperture 18, and a web portion 31 interconnecting the first and second shutter portions 32, 33. The shutter member 30 is formed as a letter U in cross-section.

The web portion 31 is of substantially the same height as that of the front side of the cartridge main body 10. The first shutter portion 32 is rectangular-shaped and of a longer length in the fore-and-aft direction and sufficiently dimensioned to open and close the head-accessing aperture 18A. The second shutter portion 33 is sufficiently dimensioned to close both the head-accessing apertures 18B and the disc table intruding opening 16 from the front surface of the lower cartridge half 12 and is rectangular-shaped and of a length in the fore-and-aft direction longer than the first shutter portion 32. The second shutter portion 33 has its terminal portion bent towards the major surface of the lower cartridge half 12 so as to be formed as the terminal guide portion 34 engaged in the transversely extending slide guide groove formed in the upper cartridge half 12, as described previously.

The above-described shutter member 30 constitutes a shutter assembly by assembling the slide member 35 pre-assembled in the shutter opening guide groove 20 formed in the front side of the cartridge main body 10 on the inner surface of the web portion 31. Since the first and second shutter portions 32, 33 of the shutter member 30 clamp the upper and lower major surfaces of the cartridge main body 10 in-between, there is no risk of the shutter member 30 or the slide member 35 from being detached even if a large impact is applied to the cartridge main body 10 such as by accidental descent of the cartridge main body 10. In addition, the shutter member 30 is normally held by the elasticity of the shutter spring 39 mounted at a front side corner 24 of the lower cartridge half 12 at the first position of closing the head-accessing apertures 18 by the first and second shutter portions 32, 33.

The slide member 35 is formed of a synthetic resin material exhibiting resistance against abrasion and sliding characteristics substantially in the form of a square-shaped rod and is of a length substantially twice the width of the web portion 31 of the shutter member 30. The slide member 35 comprises the rod-shaped base portion 38 both ends of which are provided with a first slide guide portion 37 and a second slide guide portion 38 integrally protruded towards the rear side. The portion of the rod-shaped base portion 36 formed with the second slide guide portion 36 is used as a mounting portion for the shutter member 30.

The first slide guide portion 37 is made up of a wedge-shaped guide portion engaged in a guide recess 22 formed in the inner surfaces of the upper and lower cartridge halves 11, 12 for facing the shutter opening guide groove 20, and an engagement lug which is substantially flush with the opened front surface of the cartridge main body 10 in the assembled state of the slide member 35 in the shutter opening guide groove 20 and which is engaged with the shutter opening member of the recording/reproducing apparatus. The lateral surface of the guide portion 37 opposite to the second slide guide portion 38 is formed as an inclined surface having a progressively increased thickness towards outside. The second slide guide portion 38 is formed with guide recesses engaged with the guide ribs 21 formed on the inner surfaces of the upper and lower cartridge halves 11, 12, while being formed with guide protrusions engaged in the guide recesses 22, in a manner that will be understood by those skilled in the art and need not be explained specifically.

With the slide member 35, constructed as described above, the guide portion of the first slide guide portion 37 is engaged with the guide recess 22 formed in the inner side of the shutter opening guide groove 20 of the cartridge main body 10. On the other hand, the guide protrusion of the second guide portion 38 of the slide member 35 is engaged in the guide recess 22 in the cartridge main body 10, while the guide rib 21 of the cartridge main body 10 is engaged with the guide recess. Thus the slide member 35 is moved in the transverse direction of the cartridge main body 10 along the shutter opening guide groove 20.

The shutter member 30 is assembled on the slide member 35 movably associated with the shutter opening guide groove 20. That is, the first and second shutter portions 32, 33 of the shutter member 30 clamp the major surfaces of the cartridge main body 10 in-between, while the inner surface of the web portion 31 is abutted against the mounting portion of the slide member 35 assembled in the shutter opening guide groove 20. The shutter member 30 is united to the slide member 35 by set screws, adhesive or ultrasonic welding of dowels formed as one with the slide member 35 for constituting a shutter assembly.

When the disc cartridge is loaded on the recording/reproducing apparatus, the shutter assembly is shifted, by a shutter driving member of the recording/reproducing apparatus intruded into the shutter opening guide groove 20, from the first position in which the first and second shutter portions 32, 33 close the head-accessing apertures 18 in the second position in which the shutter portions 32, 33 open the head-accessing apertures 18.

The shutter assembly is normally held under resiliency of the shutter spring 39 at the first position in which the first and second shutter portions 32, 33 of the shutter assembly 30 close the head-accessing apertures 18. The shutter spring 39 is a torsion spring of e.g., a piano wire piece having a base portion wound in a coil and both ends extending therefrom substantially in the shape of a letter V. The shutter spring 39 has its one end engaged in the second slide guide portion 38 of the slide member 35 and its other end abutted against the inner surface of the outer peripheral wall section of the cartridge main body 10, and is arranged at a front side corner 24 constituted by the upstanding peripheral wall sections 13 and the disc housing delimiting upstanding wall sections 14. The shutter spring 39 is assembled at the front side corner 24 of the cartridge main body 10 in the normal state in a slightly compressed state with accumulated spring force for maintaining the shutter member 30 via the slide member 35 in the first position in which the first and second shutter portions 32, 33 close the head-accessing apertures 18. When the above-described disc cartridge is inserted into the cartridge loader of the recording/reproducing apparatus, the shutter opening member of the recording/reproducing apparatus is inserted into the shutter opening guide groove 20 so as to be engaged with the first slide guide portion 37 of the slide member 35. The slide member 35 is thrust towards the front side corner 24 by the shutter opening member via the first slide guide portion 37 so as to be moved along the shutter opening guide grove 20 against the spring force of the shutter spring 39. By such movement of the slide guide member 38, the shutter member 30 united to the slide member 35 is shifted from the first position in which the first and second shutter portions 32, 33 close the head-accessing apertures 18 to the second position in which the shutter portions 32, 33 open the head-accessing apertures 18.

As a result of the above movement of the shutter member 30, the shutter member 30 opens the disc table intruding opening 16 so far closed by the second shutter portion 33. In this case, the shutter member 30 is moved in stable state with the terminal guide portion 34 of the second shutter portion 33 being retained by the shutter retention plate 49 throughout the area of movement thereof in the shutter guide groove.

As the shutter member 30 is moved towards the front side corner 24, the distance between the vee-shaped opening ends of the shutter spring 39 is gradually narrowed so that the spring force is stored in the shutter spring 39. When the shutter member 30 reaches the second position of opening the head-accessing apertures 18, the state of the slide member 35 is such that the distance between the second slide guide portion 38 and the inner surface of the outer peripheral wall sections of the cartridge main body 10 is reduced. In this second position of the shutter member 30 opening the head-accessing apertures 18, the disc cartridge is retained and held by the shutter holding member of the recording/reproducing apparatus.

After the end of the recording/reproducing operation, the disc cartridge of the illustrated embodiment is taken out of the cartridge loader of the recording/reproducing apparatus by an ejecting operation. At this time, the shutter holding member holding the shutter member 30 recedes. Thus the shutter member 30 is moved, under the accumulated spring force of the shutter spring 39, from the second position in which the shutter portions 32, 33 open the head-accessing apertures 18 to the first position in which the first and second shutter portions 32, 33 close the head-accessing apertures 18.

Figure 14:
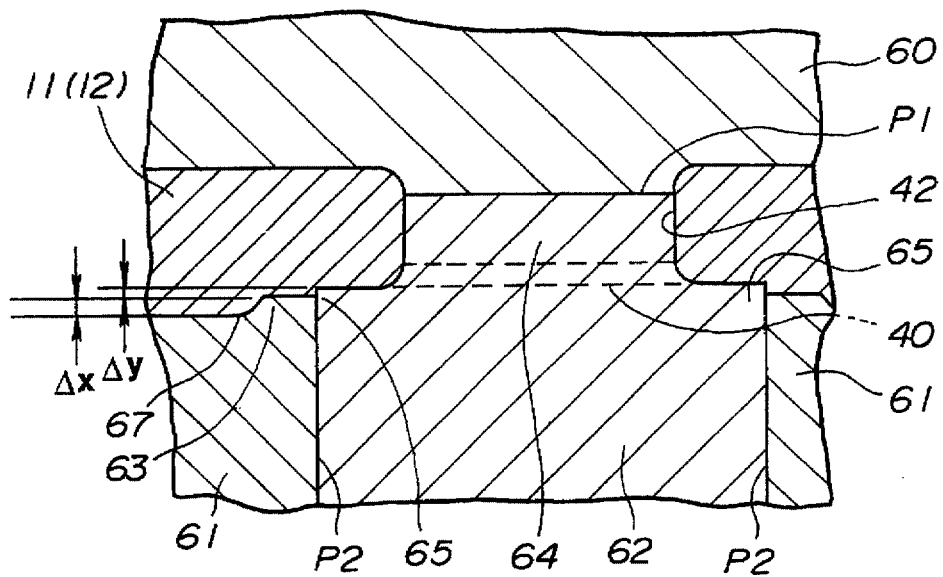
FIG. 14 is a schematic longitudinal cross-sectional view illustrating a die device for molding cartridge halves of the disc cartridge, and showing a head-accessing aperture formed in the cartridge half.

For constituting the head-accessing apertures 18, the upper half 11 and the lower half 12 of the disc cartridge of the illustrated embodiment are molded using an insert die device having an insert die 62 built into a movable die 61. Referring to FIG. 14, the die unit is basically constituted by a stationary metal mold 60 for defining a cavity for the outer surface of the upper or lower cartridge half 11 or 12, a movable die 61 for defining a cavity for the inner surface of the upper or lower cartridge half 11 or 12, and an insert die (auxiliary die) 62 built into a cut-out formed in the movable metal mold 61 for defining a cavity for the head-accessing apertures 18. The following explanation is made for convenience with reference to a die unit for molding the upper cartridge half 11.

For forming an outer opening edge of the head-accessing aperture 18, a rectangular-shaped protrusion is formed on a portion of the surface of the stationary die 60 facing the movable die 62. This rectangular-shaped protrusion has its outer peripheral portion arcuately chamfered, with the surface of the protrusion operating as a parting line P1 with respect to the insert die 62 during die closure. The movable die 61 is moved into contact with and away from the stationary die 60, so that it is spaced apart from the stationary die a distance corresponding to the thickness of the cartridge half 11. The movable die 61 has a projection 63 projected towards the stationary die 60 along the edge of a cut-out which is in register with the head-accessing aperture 18. The movable die 61 has its surface facing the stationary die 60, that is its surface constituting the disc housing section, ground or polished to a highly smoothed surface.

The projection 63 merges with the surface of the movable die 61 via an arcuate connecting portion of a smaller curvature and has a height Δx which is on the order of 0.1 mm. The projection 63 does not hinder in grinding the surface of the movable die 61. It is noted that, in the course of the surface grinding operation, the projection 63 of the movable die 61 undergoes a phenomenon of becoming gradually arcuate in profile towards a cut-out in which the insert die 62 is assembled, that is towards the die matching portion. The height of the step generated by such phenomenon is on the order of 10 to 30 μm. Since the projection is set to the height Δx on the order of 0.1 mm, there is no risk of this phenomenon reaching the surface of the movable die 61 defining the disc housing section.

The insert die 62 comprises a cavity-delimiting protrusion 64 abutted against the mating protrusion of the stationary die 60 as described above for delimiting the cavity of the head-accessing aperture 18 and a lateral extension 65 protruded laterally of the cavity-delimiting protrusion 64 for die matching with the movable die 61 along the parting line P2. The cavity-delimiting protrusion 64 has a width equal to the width of the head-accessing aperture 18 of the cartridge half 11, as a molded product, and a height slightly smaller than the thickness of the cartridge half 11. The cavity-delimiting protrusion 64 merges with the lateral extension 65 via a smooth arcuate connecting portion.

Figure 8:
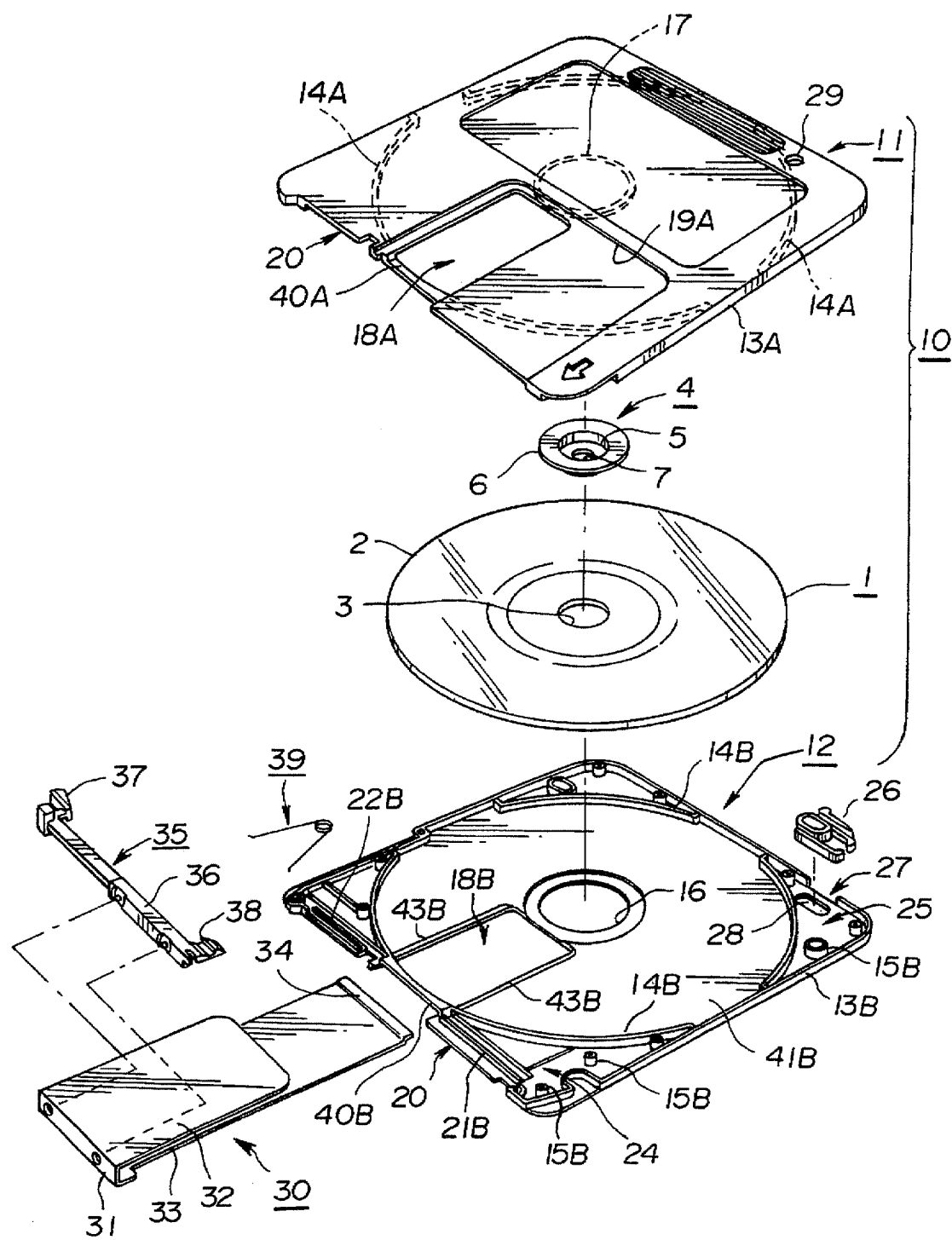
FIG. 8 is an exploded perspective view, looking from an upper side, for illustrating the inner structure of a disc cartridge according to the present invention.

The lateral extension 65 is protruded towards the stationary mold 60 with respect to the projection 63 of the movable mold 61 a distance approximately 0.1 mm or less as indicated at Δy in FIG. 14. This lateral extension 65 forms the recess 43 extending along the opening edge 42 of the head-accessing aperture 18 in the inner surface of the cartridge half 11 as a molded product in cooperation with the projection 63 of the movable die 61, as shown in FIG. 8.

With the above-described die unit, the movable die 61 with the insert mold 61 built therein is moved by a mold-closing operation with respect to the stationary die 60 for delimiting the cavity for molding the cartridge half 11. The molten resin is injected via a gate, not shown, into this cavity. This gate is provided at a position which is not obstructive in appearance or function and which permits the resin to be charged in a satisfactory state into the cavity. For example, the gate for the upper cartridge half is provided in a label sticking recess on the rear surface of the head accessing aperture 18, while that for the lower cartridge half is provided in register with the connecting recess 23 in the shutter guide member 49.

After lapse of a pre-set time since charging the resin, the movable die 61 is moved away from the stationary die 60 by way of die opening. The cartridge half 11 thus molded is taken out by being knocked towards the stationary die 60 by knock-out means, not shown, provided on the movable die 61.

Figure 15:
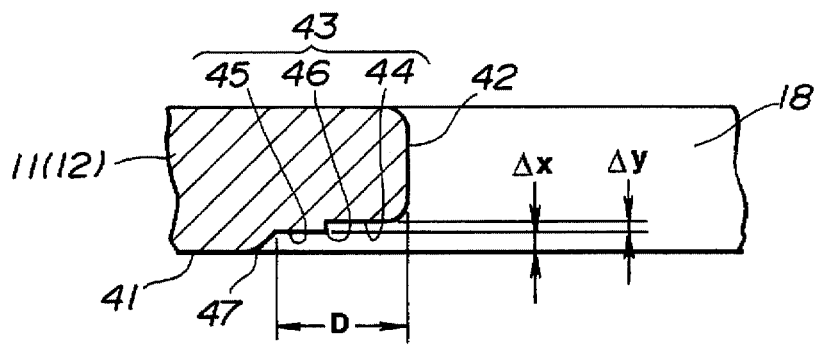
FIG. 15 is a schematic longitudinal cross-sectional view illustrating the head-accessing aperture formed in the cartridge half molded by the die device.

The recess 43 formed in the cartridge half 11 extends along the opening edge 42 of the head-accessing aperture 18 by the projection 63 of the movable die 61 and the lateral extension 65 of the insert die 62. Specifically, the recess 43 extends from the ground surface of the stationary die 61 via a chamfered portion 47 defined by the arcuate connecting portion 67 of the projection 63 as far as the opening edge 42 of the head-accessing aperture 18, as shown in FIG. 15, and has a width D on the order of 1.5 mm. The arcuate connection 87 has an extremely small radius that can hardly be discerned in FIG. 14. The depth of the recess 43 is determined by the height Δx of the projection 63 of the stationary die 61 and the height Δy of the lateral extension 65 of the insert die 62 with respect to the projection 63.

The recess 43 is made up of a first recess 44 defined by the surface of the lateral extension 65 of the insert die 65 and a second recess 45 defined by the surface of the stationary die 61. The recess 43 has a step 46 corresponding to the parting line P2 between the first and second recesses 44 and 45.

During injection molding, there are occasions wherein the charged molten resin is extruded exuded at the die matching portion between the molding dies to form burrs thereat. These burrs form a mark along the parting line on the molded article. Since the parting line P1 between the stationary die 60 and the insert die 62 is positioned at the opening edge 42 of the head-accessing aperture 18, there is no particular hindrance if burrs are produced at the parting line P1. On the other hand, there is no inconvenience that the mark of the burrs be produced on the surface of the upper cartridge half 11 to detract from the appearance.

With the upper cartridge half 11, the parting line P2 between the movable die 61 and the insert die 62 is located at the recess 43 formed along the opening edge 42. Thus, even if burrs are produced at the parting line P2, the inner surface 41 of the disc housing section is not affected, and there is no risk of damage to the major surface of the optical disc 1 housed within the disc housing section.

Figure 17:
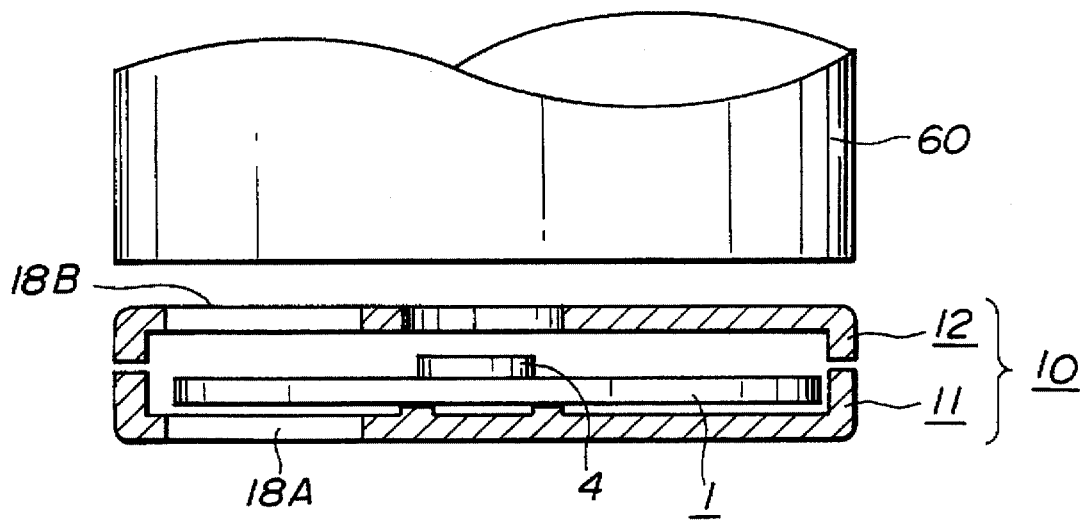
FIG. 17 illustrates the ultrasonic welding process for the cartridge main body for ultrasonically welding upper and lower cartridge halves.
Figure 18:
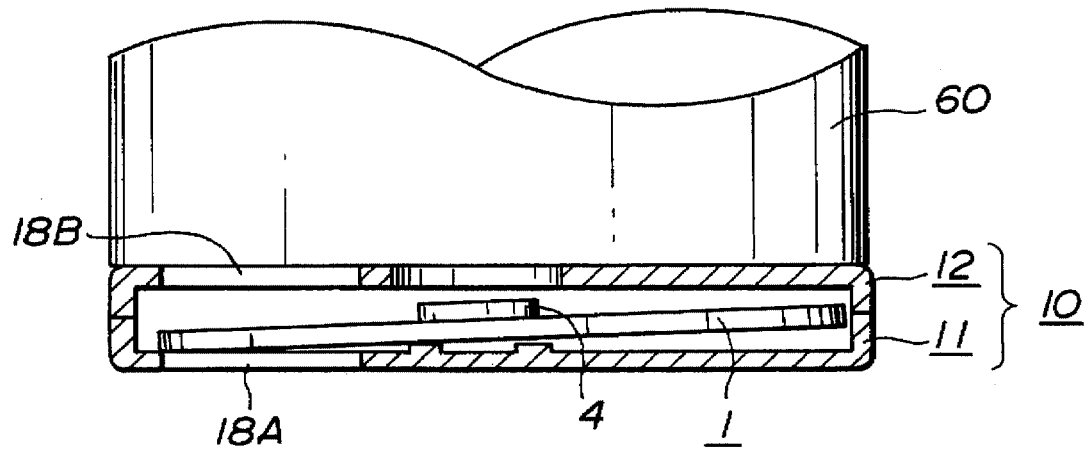
FIG. 18 illustrates the state of ultrasonic welding by the ultrasonic welding process.

The upper and lower cartridge halves 11, 12, thus molded, are assembled to form the cartridge main body 10, and the optical disc 1 is rotatably housed within the inside of the cartridge main body 10, as shown in FIGS. 17 and 18. The upper and lower cartridge halves 11, 12 are formed with the upstanding peripheral wall sections and annular wall sections as well as a plurality of fitting protrusions which are abutted together for delimiting the housing section for the optical disc 1. The upper and lower cartridge halves 11, 12 are assembled together by abutting the upstanding peripheral wall sections and the annular wall sections together and bonding the wall sections thus abutted together using an ultrasonic welder 60 for completing a thin box-shaped cartridge main body 10.

That is, the upper and lower cartridge halves 11, 12, having the abutting fitting protrusions, upstanding wall peripheral sections and the annular wall sections, are vibrated by applying ultrasonic waves from the ultrasonic welder 60 applied to the lower cartridge half 12, whereby the abutting portions are fused together due to local heating. On terminating the application of the ultrasonic waves, the fused portions are solidified and bonded together.

With the above-described upper and lower halves 11, 12, there is no inconvenience that the major surfaces of the optical disc 1 be damaged even if the optical disc 1 is vigorously vibrated within the upper and lower halves 11, 12 in the course of ultrasonic welding, as shown in FIG. 18. On the other hand, if the disc table 120 intruded via the disc table intrusion opening 16 on loading the cartridge main body on the recording/reproducing apparatus thrusts the optical disc 1 onto the upper cartridge half 11, there is no risk of damage done to the major surface of the optical disc 1.

Figure 16:
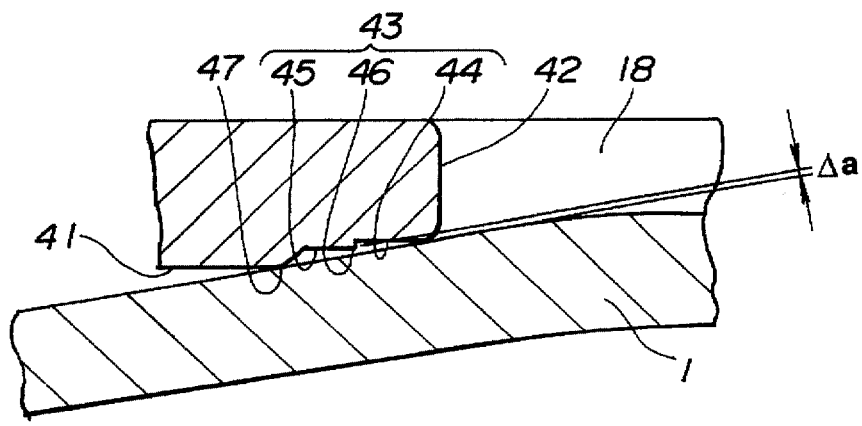
FIG. 16 is a longitudinal cross-sectional view illustrating the operation of preventing the optical disc housed within the disc cartridge from being damaged, and showing the operation of preventing damages due to burrs occurring at a die matching position.

That is, when the optical disc 1 is thrust in a tilted state against the upper cartridge half 11, the disc is supported by the inner surface 41 constituted by the ground surface of the stationary die 61, defining an end of the recess 43, the chamfered portion 47 constituted by the arcuate connecting portion of the projection 63 and the chamfered opening edge 42 of the head-accessing aperture 18, defining the opposite end of the recess 43, as shown in FIG. 16. Thus a distance Δa is maintained between the optical disc 1 and the shoulder 46 defined by the parting line 62 between the insert die 62 and the movable die 81 positioned within the recess 43, so that the disc 1 is not directly abutted against the shoulder 46 or the burrs.

Figure 19:
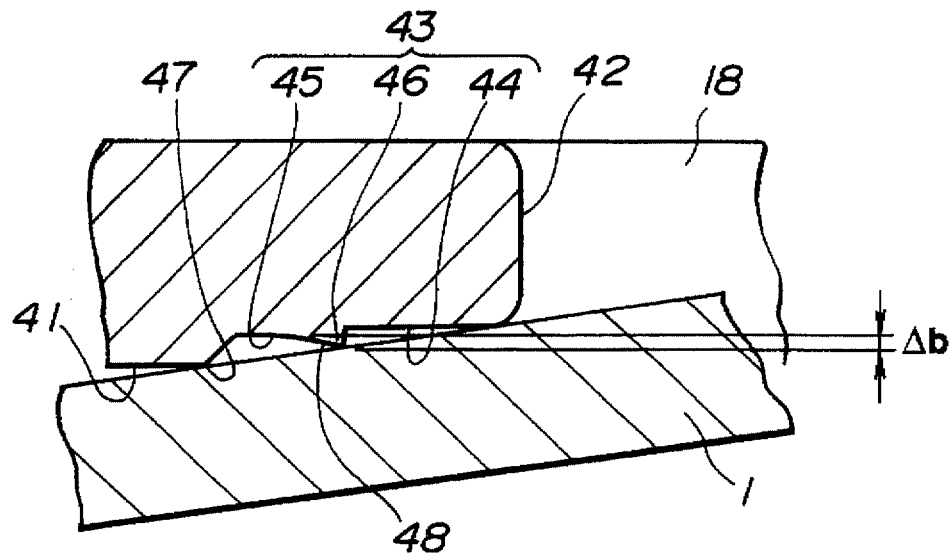
FIG. 19 is a schematic longitudinal view illustrating the operation of preventing the optical disc housed within the disc cartridge from being damaged, and showing the operation of preventing damages due to burrs occurring at the die matching position.

Specifically, the optical disc 1 is not directly abutted against the burrs 48 produced by the grinding operation of the surface of the movable die 61 on the step 46 constituted by the parting line 62 between the insert die 62 and the movable die 61 positioned within the recess 43, as shown in FIG. 19. That is, the optical disc 1 is supported by the chamfered portion 47 constituted by the arcuate connecting portion of the stationary die 61 from the inner surface 41 produced by the ground surface of the stationary die 61, defining one end of the recess 43, and by the chamfered opening edge 42 of the head-accessing aperture 18, so that a distance Δb is maintained between the optical disc 1 and the burrs 48 and hence the disc is not abutted directly against the burrs 48.

Figure 20:
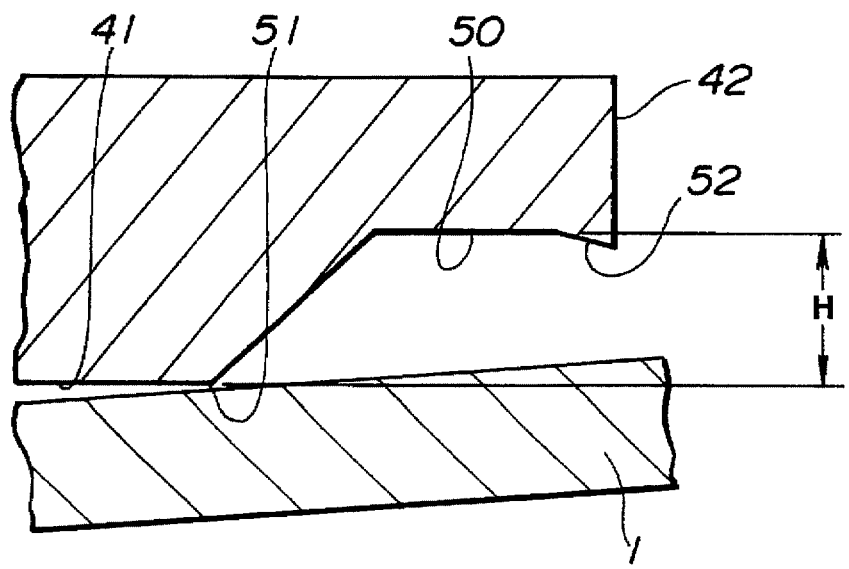
FIG. 20 is a schematic longitudinal cross-sectional view showing a disc cartridge according to a second embodiment of the present invention, and showing the operation of preventing the optical disc at the head accessing aperture formed in the cartridge half having a sufficient thickness.

FIG. 20 shows the application of the present invention to a disc cartridge the cartridge half 11 of which has a sufficient thickness. The inner surface of the cartridge half 11 has a recess 50 extending along the opening edge 42 of the head-accessing aperture 18. The recess 50 has a sufficient depth H. A connecting portion 51 between the recess 50 and the inner surface 41 of the cartridge half 11 is chamfered arcuately. On the opening edge 42 of the head-accessing aperture 18 is formed a burr 52 in continuation to the recess 50 as a result of grinding of the surface of the stationary die.

However, with the disc cartridge of the present second embodiment, even supposing that the optical disc 1 is inclined in the interior of the cartridge main body 10, the recess 50 has a sufficient depth for preventing the major surface of the optical disc 1 from being abutted against the opening edge 42 of the head-accessing aperture 18 on which the burr 52 has been produced. Consequently, with the die device for molding the cartridge half 11 of the second embodiment of the disc cartridge, a die matching position between the movable die 61 and the insert die 62 need not be formed in the recess 50.

Although the dies for forming the cavity in the inner surface and in the outer surface of the cartridge half 11 are the movable die 61 and the stationary die 60, respectively, the die construction may be reversed, that is, the die for forming the cavity in the inner surface and in the outer surface of the cartridge half 11 may be the stationary die and the movable die, respectively.

What is claimed is:

1. A method of injection molding a disc cartridge having an upper cartridge part and a lower cartridge part and a disc-shaped recording medium rotatably housed within a space defined by the upper cartridge part and the lower cartridge part, at least one of the upper cartridge part and the lower cartridge part having a head-accessing aperture for exposing at least a portion of said disc-shaped recording medium to outside, said method comprising the steps of:

forming the upper cartridge part or the lower cartridge part having said head-accessing aperture using a molding apparatus having a first die having a first protrusion for forming said head-accessing aperture, said first die defining a cavity on an upper surface of the upper or lower cartridge part, a second die for forming a cavity on the inner surface of the upper or lower cartridge part, and an insert die formed separately from and united to the second die, said insert die having an extension for forming an end face on an inner surface of the upper or lower cartridge part and a second protrusion from said extension for abutting the first protrusion of said first die during die closure for forming said head-accessing aperture in said upper or lower cartridge part, said second die having an end portion thereof connected to said insert die, said end portion having a third protrusion extending towards said first die, said second die being connected to said insert die so that an end face of a first die side of said extension of said insert die is protruded further towards said first die than an end face of the third protrusion of said second die, whereby said first second and third protrusions cooperate during injection molding to prevent burrs being formed on the upper and lower cartridge parts; and combining said upper cartridge part and said lower cartridge part with said disc-shaped recording medium in between, thereby forming said disc cartridge.

2. The method of claim 1 further comprising the step of grinding an end face of said second die opposite said first die.

3. The method of claim 1 wherein said extension of the insert die merges with said second protrusion of the insert die via an arcuate surface, whereby said arcuate surface and said first, second and third protrusions cooperate during injection molding to further prevent burrs being formed on the upper and lower cartridge parts.

4. Apparatus for injection molding a disc cartridge having an upper cartridge part, a lower cartridge part, and a disc-shaped recording medium rotatably housed within a space defined by the upper cartridge part and the lower cartridge part, at least one of the upper cartridge part and the lower cartridge part having a head-accessing aperture for exposing at least a portion of said disc-shaped recording medium to outside, said apparatus comprising:

a first die having a first protrusion for forming said head-accessing aperture, said first die defining a cavity on an upper surface of the upper or lower cartridge part;

a second die for forming a cavity on an inner surface of the upper or lower cartridge part; and an insert die formed separately from and united to said second die, said dies being capable of die closure and said insert die having an extension for forming an end face on the inner surface of the upper or lower cartridge part and a second protrusion from said extension for abutting the first protrusion of said first die during said die closure for forming said head-accessing aperture; said second die having an end portion connected to said insert die and said end portion having a third protrusion extending towards said first die, said second die being connected to said insert die so that an end face of a first die side of said extension of said insert die is protruded further towards said first die than an end face of the third protrusion of said second die, whereby said first, second and third protrusions cooperate during injection molding to prevent burrs being formed on the upper and lower cartridge parts.

5. The apparatus of claim 4 wherein said first die is stationary and said second die is movable.

6. The apparatus of claim 4 wherein said extension of the insert die merges with said second protrusion of the insert die via an arcuate surface.

7. The apparatus of claim 4 wherein said second die has an end face opposite said first die said end face having a ground surface.

* * * * *

UNITED STATES PATENT AND TRADEMARK OFFICE
CERTIFICATE OF CORRECTION

PATENT NO. : 5,667,616
DATED : September 16, 1997
INVENTOR(S) : Takatsugu Funawatari It is certified that error appears in the above-identified patent and that said Letters Patent is hereby corrected as shown below:

In the Abstract, line 16, change "abulting" to --abutting--
Col.1, line 38, after "cartridge" insert --half--
      line 39, after "cartridge" insert --half--

Col.6, line 39, change "is comprises of" to-- comprises--
      lines 46 & 47, change "is comprises of" --comprises--
Col.8, line 48, change "38" to --36--
Col.10, line 1, delete "being"
      line 13, change "comprised" to --comprises--
      line 55, change "38" to --36--
Col.12, line 5, change "38" to --35--
Col.13, line 9, delete "in"
Col.14, line 14, delete "exuded"
Col.15, line 7, change "81" to --61--

In the claims:
Col.16, line 64, after "die" insert --,--

Signed and Sealed this

Tenth Day of November 1998

Attest:

BRUCE LEHMAN

Attesting Officer      Commissioner of Patents and Trademarks